US012008927B2

(12) United States Patent
Klocke et al.

(10) Patent No.: US 12,008,927 B2
(45) Date of Patent: Jun. 11, 2024

(54) MARKING PROFILE FOR IDENTIFYING ELECTRICAL INSTALLATIONS

(71) Applicant: PHOENIX CONTACT GmbH & Co. KG, Blomberg (DE)

(72) Inventors: Sandra Klocke, Vlotho (DE); Kilian Klages, Detmold (DE); Thomas Pölker, Detmold (DE); Manuela Paus, Münster (DE); Nicole Probach, Blomberg (DE)

(73) Assignee: PHOENIX CONTACT GmbH & Co. KG, Blomberg (DE)

(*) Notice: Subject to any disclaimer, the term of this patent is extended or adjusted under 35 U.S.C. 154(b) by 367 days.

(21) Appl. No.: 17/431,999

(22) PCT Filed: Feb. 27, 2020

(86) PCT No.: PCT/EP2020/055125

§ 371 (c)(1),
(2) Date: Aug. 18, 2021

(87) PCT Pub. No.: WO2020/178127

PCT Pub. Date: Sep. 10, 2020

(65) Prior Publication Data

US 2022/0139268 A1 May 5, 2022

(30) Foreign Application Priority Data

Mar. 5, 2019 (DE) ..................... 10 2019 105 520.2

(51) Int. Cl.

| | |
|---|---|
| ***G09F 3/02*** | (2006.01) |
| ***G09F 3/00*** | (2006.01) |
| ***G09F 3/04*** | (2006.01) |
| ***H01R 13/46*** | (2006.01) |

(52) U.S. Cl.
CPC .............. *G09F 3/0295* (2013.01); *G09F 3/04* (2013.01); *H01R 13/465* (2013.01); *G09F 2003/0201* (2013.01)

(58) Field of Classification Search
CPC ..... G09F 3/06; G09F 3/16; G09F 3/20; H01R 9/24; H01R 9/26; H01R 13/465; H01R 9/2475
See application file for complete search history.

(56) References Cited

U.S. PATENT DOCUMENTS 4,268,986 A * 5/1981 Piana .................. H02G 3/0406 40/661
4,415,006 A 11/1983 Barbieri
(Continued)

FOREIGN PATENT DOCUMENTS

CN 1446361 A 10/2003
CN 1490773 A 4/2004
(Continued)

OTHER PUBLICATIONS

International Preliminary Report on Patentability issued on Sep. 16, 2021 in PCT Application No. PCT/EP2020/055125.

*Primary Examiner* — Cassandra Davis
(74) *Attorney, Agent, or Firm* — Occhiuti & Rohlicek LLP

(57) ABSTRACT

Marking profile for identifying electrical installations, comprising a marking region which has a cover surface to be labeled, comprising a support region which adjoins the marking region on the opposite side of the cover surface, comprising at least one shaped element for interlockingly securing to a receiving section, wherein the marking profile has an extruded plastic profile or consists of an extruded plastic profile and wherein the plastic profile has a constant cross-section when viewed along its longitudinal extension.

20 Claims, 4 Drawing Sheets

(56) References Cited

U.S. PATENT DOCUMENTS

| | | | | | |
|---|---|---|---|---|---|
| 4,637,676 | A * | 1/1987 | Simonsen | H01R 9/2683 439/725 |
| 6,843,008 | B2 * | 1/2005 | Mellgren | G09F 3/205 174/112 |
| 10,062,979 | B2 * | 8/2018 | Adams | G09F 3/06 |
| 10,369,735 | B2 * | 8/2019 | Speith | B29C 48/12 |
| 11,427,015 | B2 * | 8/2022 | Speith | B41J 11/057 |
| 11,545,053 | B2 * | 1/2023 | Wieneke | B41F 17/00 |
| 2011/0279841 | A1 * | 11/2011 | Reibke | G09F 3/205 225/96 |
| 2017/0282431 | A1 * | 10/2017 | Speith | G09F 3/0295 |
| 2023/0378668 | A1 * | 11/2023 | Dogan | G09F 3/12 |

FOREIGN PATENT DOCUMENTS

| | | | | |
|---|---|---|---|---|
| CN | 101987533 | A | | 3/2011 |
| CN | 102361283 | A | | 2/2012 |
| CN | 203552597 | U | | 4/2014 |
| CN | 106796766 | A | | 5/2017 |
| DE | 1857546 | U | | 8/1962 |
| DE | 1889286 | U | * | 1/1964 |
| DE | 1959596 | U | | 5/1967 |
| DE | 9417391 | U1 | | 12/1994 |
| DE | 19843742 | A1 | | 9/1999 |
| DE | 102006003780 | A1 | | 3/2007 |
| DE | 202008003269 | U1 | | 7/2009 |
| DE | 102009014694 | A1 | | 10/2010 |
| EP | 0185518 | A2 | | 6/1986 |
| EP | 0612052 | A1 | | 8/1994 |
| ES | 369890 | A1 | * | 7/1971 |
| FR | 2724250 | A1 | | 3/1996 |
| GB | 8431727 | | | 1/1985 |
| RU | 2088990 | C1 | | 8/1997 |
| WO | 1993024941 | A1 | | 12/1993 |
| WO | 2010008308 | A1 | | 1/2010 |
| WO | 2018189066 | A1 | | 10/2018 |

* cited by examiner

MARKING PROFILE FOR IDENTIFYING ELECTRICAL INSTALLATIONS

CROSS-REFERENCE TO RELATED APPLICATIONS

This application is a national phase under 35 U.S.C. 371 of International Application No. PCT/EP2020/055125 filed on Feb. 27, 2020, which claims priority to German Application No. 10 2019 105 520.2 filed on Mar. 5, 2019, the contents of all of which are hereby incorporated by reference in their entireties.

The present invention relates to a marking profile for identifying electrical installations and a method for producing a marking profile.

When producing labels for electrical installations, e.g., for marking terminal blocks in a control cabinet, the challenge is to produce and install the labels as efficiently as possible.

When printing on marking profiles provided as continuous material, it should be ensured that the marking profile has the dimensional stability required for the mounting and is also sufficiently flexible to be labeled by a label printer, such as a thermal transfer printer or the like.

When printing on marking profiles provided as continuous material, it should also be ensured that the slippage and/or deviations in the feed or in the feed speed when the marking material is fed and passed through the printer can be corrected so a high level of printing accuracy can be achieved even over longer printing lengths. This represents a challenge, in particular, in the case of a non-divided labeling profile which has no predetermined separation points or is segmented in the longitudinal direction.

Against this background, the present invention is based on the technical problem of specifying a marking profile and a method for producing a marking profile which at least partially or completely solves the above challenges. In the present case, this is achieved by a marking profile according to claim 1 and a method according to claim 10. Further embodiments of the invention can be found in the dependent claims and the following description.

According to a first aspect, the invention relates to a marking profile for identifying electrical installations with a marking region which has a cover surface to be labeled with a support region which adjoins the marking region on the opposite side of the cover surface, comprising at least one shaped element for interlockingly securing to a receiving section, wherein the marking profile has an extruded plastic profile or consists of an extruded plastic profile and wherein the plastic profile has a constant cross-section when viewed along its longitudinal extension.

Because the plastic profile has a constant cross-section along its longitudinal extension, the marking profile can be tailored to any length and adapted to the corresponding length of a terminal block or a strip provided for the mounting on a supporting rail, to which the marking profile is to be interlockingly secured and/or latched with its shaped element.

Accordingly, when viewed along its longitudinal extension, the plastic profile is non-divided and has no predefined breaking points or recesses along which the marking profile has to be tailored.

It goes without saying that after the marking profile has been printed or marked, a perforation can be made in the marking profile as a predetermined breaking point in order to specify a length intended for the final installation after the labeling has been completed.

According to a further embodiment of the marking profile, it is provided that a plastic of the plastic profile has a Shore hardness selected from a range between 85A and 54D or a plastic of the plastic profile has a Shore hardness selected from a range between 75A and 70D or a plastic of the plastic profile has a Shore hardness selected from a range between 75A and 60D (Shore hardness according to DIN ISO 7619-1 (3s)). What this means is that the Shore hardness of the plastic of the entire plastic profile is, for example, Shore D 65 or, for example, Shore D 75.

The plastic profile thus has sufficient flexibility to be deformed and labeled between a printing roller and a printing head within a label printer, such as a thermal transfer printer or the like. On the other hand, the plastic profile offers the necessary rigidity to be positively locked in a reliable manner and to be dimensionally stable within a receiving section. For this purpose, shaped elements, for example, laterally projecting webs, can be provided, which, when viewed transversely to a longitudinal extension, engage in undercuts or a groove of a receiving section.

In particular, the marking profile consists of exactly one plastic, preferably a thermoplastic elastomer, even more preferably a thermoplastic polymer, copolymer or polymer blend.

The marking profile can have a thermoplastic elastomer or consist of a thermoplastic elastomer, in particular a thermoplastic polymer, copolymer or polymer blend, such as thermoplastic polyurethanes (TPE-U) or the like.

The marking profile can have a thermoplastic or consist of a thermoplastic such as polyvinyl chloride (PVC), polyethylene (PE), polyurethanes (PUR), thermoplastic polyurethanes (TPE-U) or the like.

A printing roller of a printer can be profiled in order to reliably support and guide the marking profile.

According to a further embodiment of the marking profile, it is provided that the plastic profile is a solid profile. This means that the plastic profile, when viewed in a cross-section, consists of solid material and has no cavities or chambers. This way, a dimensionally stable marking profile can be specified in a simple and reliable manner.

Alternatively, it can be provided that the plastic profile of the marking profile is a hollow profile, i.e., that it has a closed profile cross-section. This means that, when viewed in a cross-section, the plastic profile has a cavity which is delimited by the plastic of the plastic profile. This way, a light marking profile can be produced with less material, making said profile inexpensive to produce.

Alternatively, it can be provided that the plastic profile of the marking profile has an open profile cross-section in a cross-section, such as a C-profile, a U-profile, a V-profile, a double-T-profile or the like. Thus, when viewed in a cross-section, the marking profile can be shaped, for example, in the manner of a C-profile, with the marking region and the shaped element being connected via a web. The advantages already mentioned for the hollow profile, i.e., that a light marking profile can be produced inexpensively with less use of material, apply to such a profile that is open on one, two or more sides. The open profile cross-section has the further advantage that it is more flexible than, for example, the hollow profile.

If the marking profile has a plastic profile made of solid material or a hollow profile, the plastic profile can be designed with mirror symmetry when viewed in a cross-section.

If the plastic profile of the marking profile is shaped like a C-profile, the plastic profile can have an asymmetrical shape when viewed in a cross-section, wherein, for example, a web connecting the marking region and the shaped element is arranged on one side at an offset from a center plane of the plastic profile.

It can be provided that, viewed in a cross-section, the marking region is arched, in particular has a convex shape. The outwardly curved shape allows the surface to be labeled or the marking region to be positioned more effectively on a print head of a printer. Alternatively, it can be provided that the marking region is flat or planar.

It can be provided that the marking region, when viewed in a cross-section, has a width in a range from 8 mm or more to 15 mm or less, in particular that the marking region, when viewed in a cross-section, has a width of 15 mm, 12 mm, 11 mm, 10.8 mm or 10.5 mm.

Alternatively or in addition, it can be provided that the marking profile, when viewed in a cross-section, has a height in a range from 2 mm or more to 6 mm or less, in particular that the marking profile, when viewed in a cross-section, has a height of 3 mm or 4.2 mm or 4.4 mm.

Alternatively or additionally, it can be provided that the marking region, when viewed in a cross-section, has a thickness in a range from 0.3 mm or more to 2 mm or less, in particular, that the marking region, when viewed in a cross-section, has a thickness of 1.1 mm or 0.5 mm or 0.9 mm.

Alternatively or additionally, it can be provided that the shaped element, when viewed in a cross-section, has a thickness in a range from 0.5 mm or more to 2.8 mm or less, in particular, that the shaped element, when viewed in a cross-section, has a thickness of 1 mm.

The marking profile can therefore be dimensioned in the fully assembled state, depending on the mounting and installation space requirements.

It can be provided that the marking profile has optically detectable position marks that are spaced apart from one another on at least one surface on the opposite of the cover surface, wherein intermediate regions are formed between the position marks and the position marks, in particular, have reflective properties that differ from the intermediate regions.

The position marks are used to determine the relative position of the marking profile to a printer such as a label printer or the like. This way, the relative position of the marking profile, which can be provided as continuous material, for example, with respect to a print head, can be detected in order to achieve a high printing accuracy even over longer printing lengths.

"Optically detectable position mark" means in the present case that the position mark can be detected by an optical detector such as a light sensor, a light barrier or the like.

Another embodiment of the marking profile is characterized in that the position marks are formed by a plurality of regions that are spaced apart in the longitudinal extension and have limited reflectivity and/or limited translucency, wherein the regions with limited reflectivity and/or limited translucency are formed, in particular, by black or dark coloring. The position marks can be so-called black marks.

For example, local coloring and/or gluing and/or coating can be used to create a respective position mark that can be detected with an optical sensor.

Alternatively or in addition, a respective position mark that can be detected with an optical sensor can be created by providing an at least partially light-permeable region which is surrounded by intermediate regions that are less light-permeable than the position mark.

In order to be compact and yet reliably detectable, a position mark can have a length of 4 mm or more measured in the longitudinal extension. Alternatively or additionally, a position mark can have a height, measured transversely to the longitudinal extension, of 3 mm or more.

Each position mark can be provided two-dimensionally on the cover surface itself or on a surface on the opposite side of the cover surface.

In order to achieve high printing accuracy, the position marks, when viewed in the longitudinal extension, can have a spacing of 20 mm or more, in particular a spacing of 30 mm or more, and in particular a spacing of 30 mm.

According to a second aspect, the invention relates to a method for producing a marking profile comprising the method steps of: plasticizing at least one plastic in an extrusion device; extruding the marking profile by means of the extrusion device with the marking profile being formed according to the invention; feeding the marking profile to a marking device such as a label printer, a thermal transfer printer or the like; customizing and/or perforating the marking profile to a predefined length.

By using a marking profile according to the invention, a high print quality can be achieved with a simultaneous high flexibility with regard to the marking length.

It can be provided that the cover surface is initially labeled in a continuous printing process for a plurality of individual profiles to be produced and separately assembled in the final assembly such that the cover surface is, for example, provided with the marking for two or more, three or more, or a plurality of individual profiles in a continuous printing process.

The marking profile is then assembled and/or perforated to a predefined length of a respective individual profile. The individual profiles can have the same length or have different lengths. The individual profiles can also be referred to as marking strips. In particular, an individual length can be predefined for each individual profile or for each marking strip.

Having been marked and customized, the individual profile or marking strip can then be snapped into a terminal block or a strip provided on a mounting rail for mounting purposes.

To the extent that the marking profile has position marks, a high level of printing accuracy can be achieved, in particular in the event that the marking profile is provided as a continuous material and a plurality of marking strips are produced one after the other.

As far as the marking profile has position marks, it can be provided that before, during or after the marking, at least two or more position marks of the marking profile are optically detected, wherein a relative position of the marking profile to a print head of the printer is determined on the basis of the detected position marks.

In order to achieve a high level of printing accuracy even over long printing lengths, a further embodiment of the method provides that a feed speed of the marking profile into the label printer and/or a print head movement of the label printer is adapted on the basis of the detected position markers.

According to a further embodiment of the method, alternatively or additionally, the assembly and/or perforation of the marking strip can also be adapted on the basis of the detected position markers, wherein the length of the labeling strip is adapted on the basis of the detected position markers in order to achieve a high level of printing accuracy even over long printing lengths.

If a printer, in particular a label printer, that is used has a tolerance of +0.1% at a spacing of 30 mm between the position markers in the feed or the longitudinal direction of the marking profile at a constant feed rate, i.e., the pressure feed rate is too high, the marking strip to be subsequently produced is stretched accordingly by 0.3 mm. If a printer, in particular a label printer, that is used has a tolerance of −0.1% at a spacing of 30 mm between the position markers in the feed or the longitudinal direction of the marking profile at a constant feed rate, i.e., the pressure feed rate is too small, the marking strip to be subsequently produced is shortened accordingly by 0.3 mm.

It can be provided that such a length compensation described above is calculated and carried out across a plurality of successive marking strips.

Accordingly, a further embodiment of the method can be characterized in that a plurality of marking strips are produced from the marking profile, wherein the length of a first marking strip and/or the length of a second marking strip is increased or decreased if a deviation in the feed speed has been detected on the basis of the detected position markers, in particular if the feed speed is set to be constant.

The invention is described in greater detail in the following with reference to drawings showing embodiments in which, schematically:

To make the following statements easier to understand, a coordinate system with the axes x, y, z has been introduced in FIG. 1-4.

Figure 1:
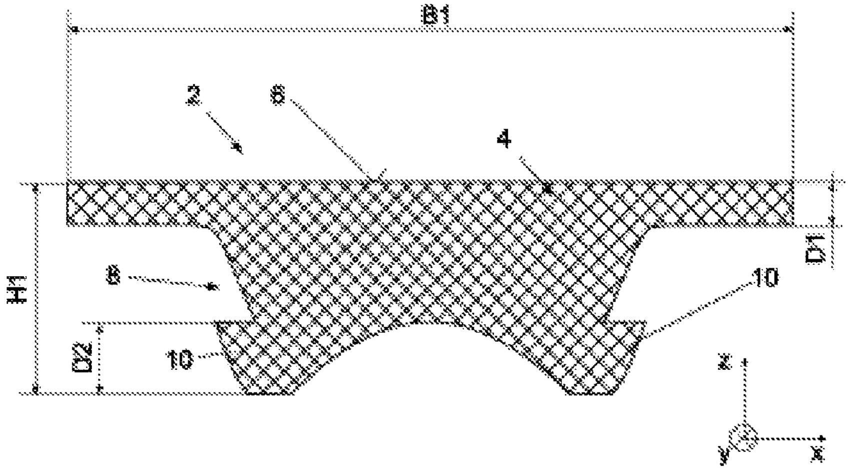
FIG. 1 is a marking profile according to the invention in a cross-section.

FIG. 1 is a marking profile 2 for marking electrical installations. The marking profile is shown in a cross-section along the plane X-Z, wherein a longitudinal extension of the marking profile 2 is oriented along the y-axis.

The marking profile 2 has a marking region 4 which has a cover surface 6 to be labeled. The marking profile 2 has a support region 8 which adjoins the marking region 4 on the opposite side of the cover surface 6.

The marking profile 2 also has two shaped elements 10 for interlockingly securing the marking profile 2 to a receiving section. Such a receiving section can be, for example, a groove or a groove profile with a corresponding undercut in which the shaped elements 10 can be interlockingly secured.

The marking profile 2 in the present case consists of an extruded plastic profile 2. The plastic profile 2 has a constant cross-section along its longitudinal extent, i.e., when viewed along the y-axis.

The plastic profile 2 has a plastic with a Shore hardness in a range from 85A to 54D.

In the present case, the plastic profile 2 is a solid profile 2. As can be seen in FIG. 1, this means that the plastic profile 2 has no cavities.

The marking region 4 has a width B1 of 10.5 mm. The marking profile 2 has a height H1 of 3 mm. The marking region 4 has a thickness D1 of 0.5 mm.

The shaped elements 10 are formed as webs 10 which protrude transversely to the longitudinal extent and which have a thickness D2 of 1 mm.

Figure 2:
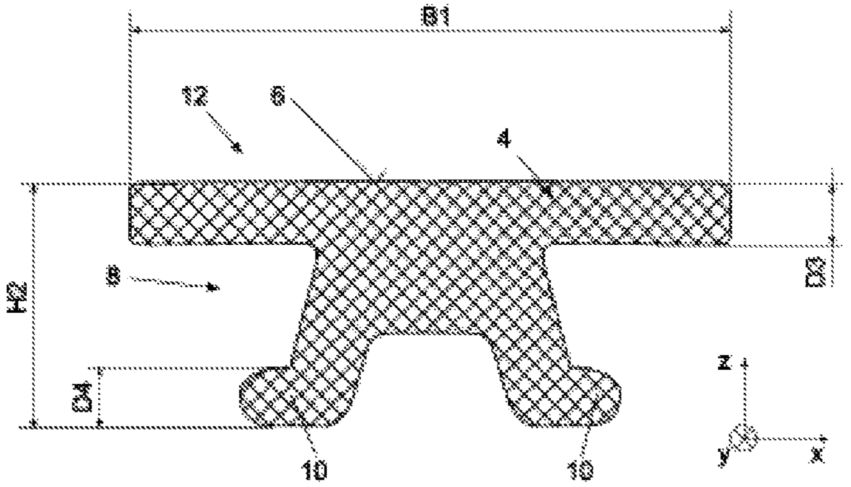
FIG. 2 is a further marking profile according to the invention in a cross-section.

FIG. 2 shows a further variant of a marking profile 12 for identifying electrical installations in a cross-section. In the following, only the differences from the exemplary embodiment described above with reference to FIG. 1 will be discussed in order to avoid repetitions. The same features are assigned the same reference symbols.

The marking profile 12 differs from the exemplary embodiment, according to FIG. 1, in its cross-sectional shape and the individual dimensions. The marking profile 12 also has a width B1 of 10.5 mm in the marking region 4.

The marking profile 12 has a height H2 of 4.2 mm. The marking region 4 of the marking profile 12 has a thickness D3 of 1.1 mm. The shaped elements 10 of the marking profile 12 have a thickness D4 of 1.2 mm.

Figure 3:
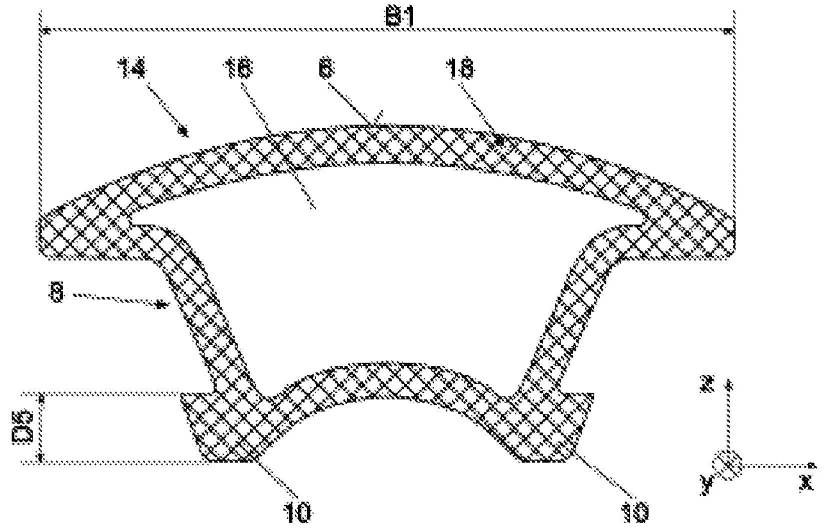
FIG. 3 is a further marking profile according to the invention in a cross-section.

FIG. 3 is a further variant of a marking profile 14 in a cross-section. Again, only the differences from the exemplary embodiments discussed above are shown. The marking profile 14 is a plastic profile 14 which is designed as a hollow profile 14. The hollow profile 14 therefore has a cavity 16.

The marking profile 14 also has a marking region 18 which, when viewed in the present cross-section, is arched or has a convex shape. The width B1 of the marking region is again 10.5 mm. The webs 10 or shaped elements 10 have a thickness D5 of 1.05 mm.

Figure 4:
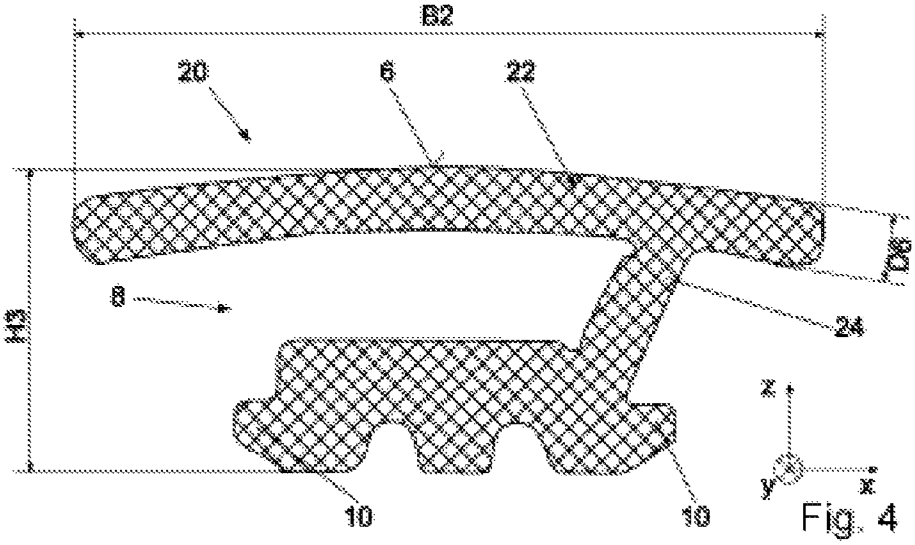
FIG. 4 is a further marking profile according to the invention in a cross-section.

FIG. 4 shows a further marking profile 20 in a cross-section, wherein the marking profile 20 differs from the marking profiles described above in that it is a plastic profile 20 that is shaped like a C-profile, wherein a marking region 22 of the plastic profile 20 and a shaped element 10 are connected to one another via a web 24.

The plastic profile 20 has a width B2 of 10.8 mm. A thickness D6 of the marking region 22 is 0.9 mm. A height H3 of the marking profile 20 is 4.4 mm.

The marking profiles 2, 12, 14, 20 can have position marks. This is described below by way of example for a marking profile 102.

Figure 5:
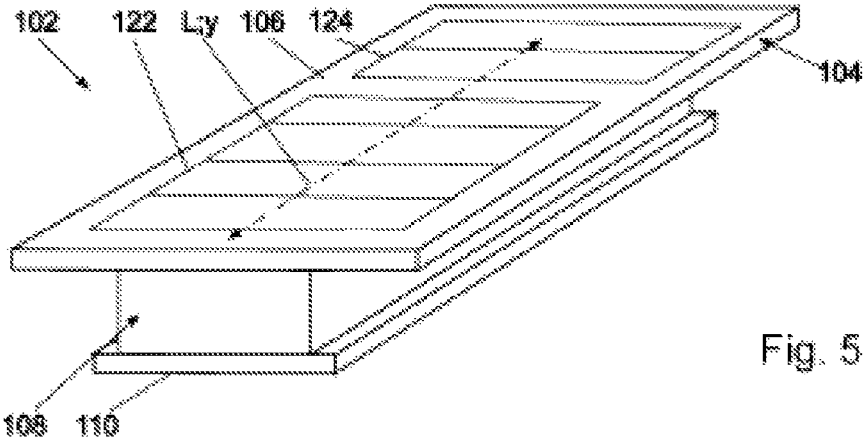
FIG. 5 is a marking profile according to the invention in a perspective view.
Figure 6:
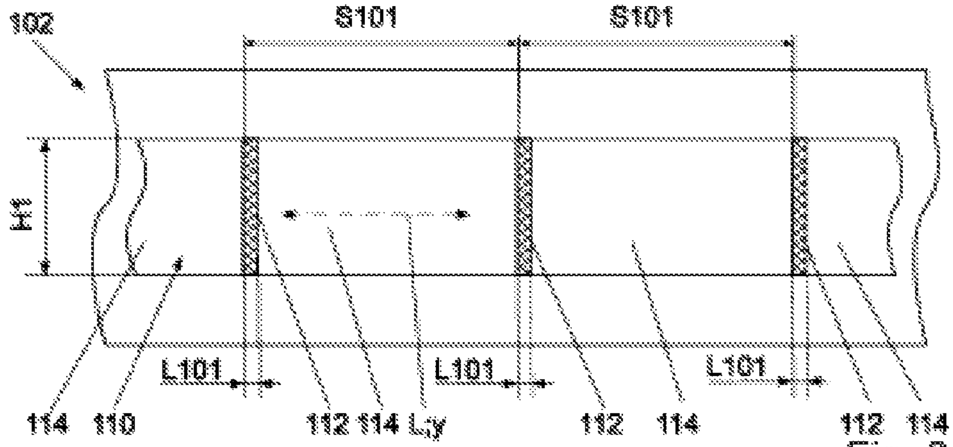
FIG. 6 is the marking profile from FIG. 1 in a view from below.
Figure 7:
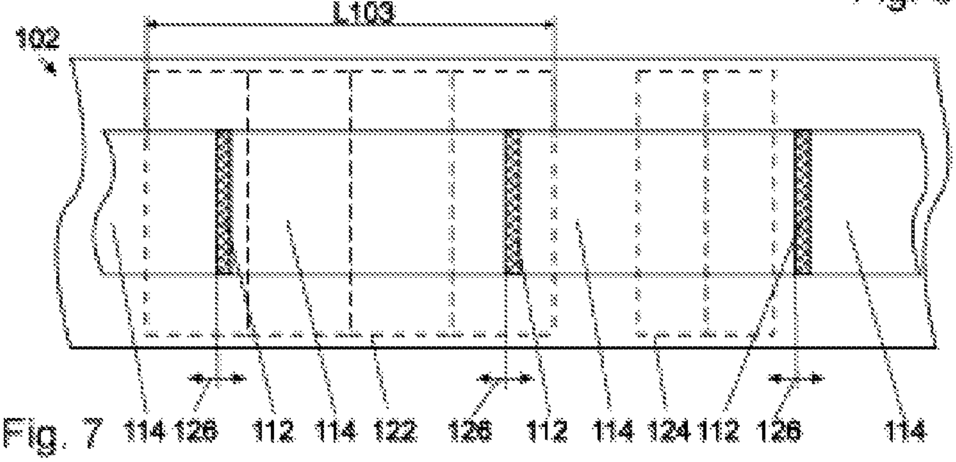
FIG. 7 is the marking profile from FIG. 1 in a further view from below.

FIG. 5 shows a marking profile 102 for identifying electrical installations. The marking profile 102 has a marking region 104 which has a cover surface 106 to be labeled.

The marking profile 102 has a support region 108 which adjoins the marking region 104 on the opposite side of the cover surface 106. As can be seen from FIG. 5, the support region 108 has, at least in portions, a smaller width than the marking region 104 in a region that is transverse to the direction of longitudinal extent L.

The marking profile 102 is provided to a printer as continuous material.

The marking profile 102 has a constant cross-section viewed along its longitudinal extent. That means that the marking profile 102 is not prefabricated with predetermined breaking points or the like and that is has no formed notches that would predetermine a longitudinal division.

The marking profile 102 has optically detectable position marks 112 which are spaced apart from one another on a surface 110 on the opposite side of the cover surface 106. Intermediate regions 114 are formed between the position marks 112, wherein the position marks 112 have reflective properties that differ from those of the intermediate regions 114.

In the present case, the position marks 112 are formed by a plurality of regions 112 that are spaced apart from one another in the longitudinal extension L and have limited reflective properties. The position marks 112 are formed by a local coloring of the marking profile 102 which is made of plastic.

In the present case, a respective position mark 112 has a length L101 of 4 mm when measured in the longitudinal extension direction L. A respective position mark 112 has a height H101 of 20 mm when measured transversely to the longitudinal extension L. The position marks 112, when viewed in the longitudinal extension L, are spaced 30 mm apart from one another. The distance S101 is thus 30 mm.

Figure 8:
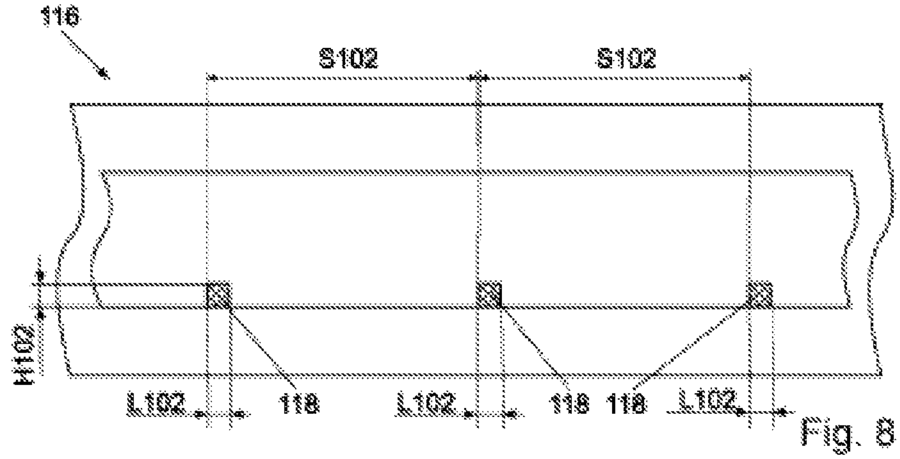
FIG. 8 is another variant of a profile according to the invention in a view from below.
Figure 9:
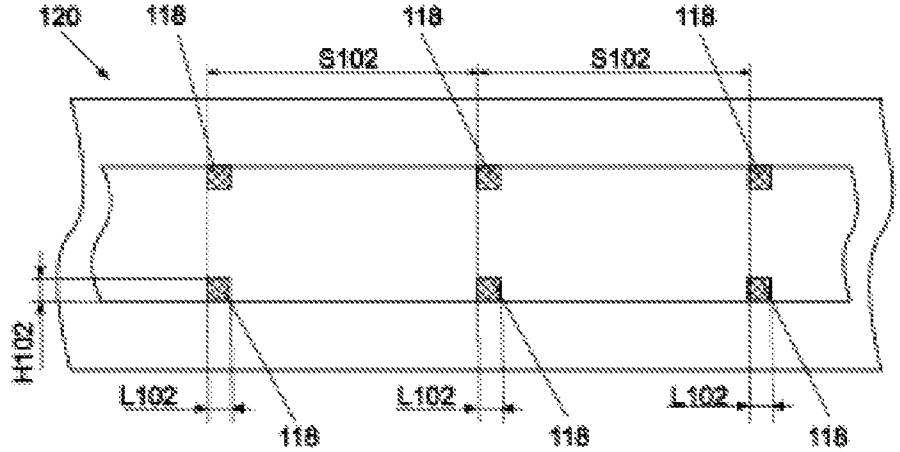
FIG. 9 is another variant of a profile according to the invention in a view from below.

FIGS. 8 and 9 show further embodiments of marking profiles, according to the invention, with only the differences from the exemplary embodiment described above being discussed in order to avoid repetition.

The embodiment of a marking profile 116 shown in FIG. 8 differs from the embodiment described above in that position marks 118 are provided whose height H102 is only 3 mm. In this case, the length L102 is 4 mm. According to the further variant of a marking profile 120, such position marks 118 are arranged in two rows (FIG. 9).

To produce a marking strip or an individual profile for an electrical installation, a marking profile 102, 116, 120 is first provided.

The marking profile 102, 116, 120 is fed to a printer (not shown). Inside the printer, the cover surface 106 is labeled in the region of the printing regions 122, 124.

Subsequently, the respective marking profile is customized or cut to length into at least one, two or more marking strips where, for example, a predefined length L103 is cut from the marking profile 102 for the printing region 122 provided for a first marking strip.

The respective position marks 112, 118 are optically detected before, during or after the marking.

In the present case, a plurality of marking strips is produced from a respective marking profile 102, 116, 120, wherein the length of a first marking strip and/or the length of a second marking strip is increased or decreased if a deviation in the feed speed of the printer has been detected on the basis of the detected position marks, especially if the feed speed is set to a constant value. The correction of the length is indicated by the arrows 126.

The invention claimed is:

1. Marking profile for identifying electrical installations,
comprising a marking region which has a cover surface to be labeled,
comprising a support region which adjoins the marking region on the opposite side of the cover surface,
comprising at least one shaped element for interlockingly securing to a receiving section,
wherein the marking profile has an extruded plastic profile or consists of an extruded plastic profile,
wherein the plastic profile has a constant cross-section when viewed along its longitudinal extension,
the marking profile has optically detectable position marks that are spaced apart from one another on at least one surface on the opposite side of the cover surface, and
wherein intermediate regions are formed between the position marks and
wherein the position marks have reflective properties that differ from the intermediate regions.

2. Marking profile according to claim 1, characterized in that
a plastic of the plastic profile has a Shore hardness that is selected from a range from 85A to 54D, or
a plastic of the plastic profile has a Shore hardness that is selected from a range from 75A to 70D, or
a plastic of the plastic profile has a Shore hardness that is selected from a range from 75A to 60D.

3. Marking profile according to claim 1, characterized in that
the plastic profile is a solid profile.

4. Marking profile according to claim 1 or, characterized in that
the plastic profile is a hollow profile.

5. Marking profile according to claim 1 or, characterized in that
the plastic profile, when viewed in a cross-section, has an open profile cross-section, the open profile cross-section being a C-profile.

6. Marking profile according to claim 1, characterized in that the marking region, when viewed in a cross-section, is curved and has a convex shape.

7. Marking profile according to claim 1, characterized in that the marking region, when viewed in a cross-section, has a width in a range from 8 mm or more to 15 mm or less.

8. Marking profile according to claim 7, characterized in that the marking region, when viewed in a cross-section, has a width of 15 mm, 12 mm or 11 mm.

9. Marking profile according to claim 1, characterized in that
the position marks are formed by a plurality of regions that are spaced apart from one another in a longitudinal extension, that are reflecting to a limited extent and/or are light-permeable to a limited extent, wherein the regions reflecting to a limited extent and/or being light-permeable to a limited extent are formed by a black or dark coloring, and/or
a position mark has a length of 4 mm or more when measured in the longitudinal extension and/or a height of 3 mm or more when measured transversely to the longitudinal extension, and/or
the position marks, when viewed in the longitudinal extension, have a spacing of 20 mm or more.

10. Marking profile according to claim 9, wherein the position marks, when viewed in the longitudinal extension, have a spacing of 30 mm or more.

11. Marking profile according to claim 9, wherein the position marks, when viewed in the longitudinal extension, have a spacing of 30 mm.

12. Method for producing a marking profile, comprising the steps of:
plasticizing at least one plastic in an extrusion device;
extruding the marking profile by means of the extrusion device, wherein the marking profile is formed according to claim 1;
feeding the marking profile to a marking device;
customizing and/or perforating the marking profile to a predefined length.

13. Method for producing a marking profile according to claim 12 wherein the marking device is a label printer or a thermal transfer printer.

14. Marking profile according to claim 1, characterized in that the marking profile, when viewed in a cross-section, has a height in a range from 2 mm or more to 6 mm or less.

15. Marking profile according to claim 1, characterized in that the marking profile, when viewed in a cross-section, has a height of 3 mm or 4.2 mm or 4.4 mm.

16. Marking profile according to claim 1, characterized in that the marking region, when viewed in a cross-section, has a thickness in a range from 0 3 mm or more to 2 mm or less.

17. Marking profile according to claim 16, characterized in that the labeling region, when viewed in a cross-section, has a thickness of 1 1 mm or 0.5 mm or 0.9 mm.

18. Marking profile according to claim 1, characterized in that the labeling region, when viewed in a cross-section, has a thickness of 1 1 mm or 0.5 mm or 0.9 mm.

19. Marking profile according to claim 1, characterized in that the shaped element, when viewed in a cross-section, has a thickness in a range from 0.5 mm or more to 2.8 mm or less.

20. Marking profile according to claim 1 wherein the shaped element, when viewed in a cross-section, has a thickness of 1 mm.

* * * * *